United States Patent
Terada

(10) Patent No.: US 12,317,219 B2
(45) Date of Patent: May 27, 2025

(54) COMMUNICATION SYSTEM

(71) Applicant: SoftBank Corp., Tokyo (JP)

(72) Inventor: Yusuke Terada, Tokyo (JP)

(73) Assignee: SoftBank Corp., Tokyo (JP)

(*) Notice: Subject to any disclaimer, the term of this patent is extended or adjusted under 35 U.S.C. 154(b) by 0 days.

(21) Appl. No.: 18/780,517

(22) Filed: Jul. 23, 2024

(65) Prior Publication Data

US 2024/0381296 A1   Nov. 14, 2024

Related U.S. Application Data

(63) Continuation of application No. PCT/JP2023/001221, filed on Jan. 17, 2023.

(51) Int. Cl.
*H04W 64/00* (2009.01)
*H04W 16/28* (2009.01)
*H04W 24/02* (2009.01)
*H04W 84/06* (2009.01)

(52) U.S. Cl.
CPC ........... *H04W 64/00* (2013.01); *H04W 16/28* (2013.01); *H04W 24/02* (2013.01); *H04W 84/06* (2013.01)

(58) Field of Classification Search
CPC . H04W 16/18; H04W 64/003; H04W 64/006; H04W 84/06; H04W 36/08; H04W 36/14; H04W 36/38; H04W 4/02; H04W 48/18; H04W 60/04; H04W 76/12; H04W 76/15; H04W 88/06
USPC ....... 455/456.1, 404.2, 456.3, 420, 418, 411, 455/431, 427, 66.1
See application file for complete search history.

(56) References Cited

U.S. PATENT DOCUMENTS 10,084,535 B1 * 9/2018 Speidel ............. H04B 7/18532
10,531,240 B1 * 1/2020 Sciancalepore ....... G01S 5/0249
(Continued)

FOREIGN PATENT DOCUMENTS

JP   H1155740 A   2/1999
JP   2019213078 A   12/2019
(Continued)

OTHER PUBLICATIONS

International Search Report and Written Opinion (ISA/237) of the International Search Authority for International Patent Application No. PCT/JP2023/001221, mailed by the Japan Patent Office on Mar. 7, 2023.
(Continued)

*Primary Examiner* — Joseph Arevalo

(57) ABSTRACT

There is provided a communication system, comprising: a base station unit that is mounted on a flight vehicle, forms a wireless communication area by radiating a beam to a ground, and communicates wirelessly with a user terminal in the wireless communication area; a processing server unit that is communicatively connected to the base station unit and provides a service to the user terminal in the wireless communication area: a closed-network core unit that provides a mobile communication service of a closed-area network in the wireless communication area formed by the base station unit. The processing server unit may be mounted on the flight vehicle and the closed-network core unit may be arranged in a closed-network core apparatus arranged on the ground.

20 Claims, 8 Drawing Sheets

(56) References Cited

U.S. PATENT DOCUMENTS

| | | | |
|---|---|---|---|
| 2013/0324070 A1* | 12/2013 | Bennett | H04W 84/005 455/431 |
| 2016/0157075 A1* | 6/2016 | Ho | H04W 56/0015 455/404.1 |
| 2017/0099650 A1 | 4/2017 | Kim | |
| 2018/0183529 A1* | 6/2018 | Coutts | G01R 29/10 |
| 2020/0170047 A1* | 5/2020 | Xiang | H04L 5/00 |
| 2020/0187176 A1* | 6/2020 | Chai | H04W 72/23 |
| 2021/0199789 A1* | 7/2021 | Machida | H04W 64/006 |
| 2021/0218465 A1 | 7/2021 | Sai | |
| 2021/0309388 A1* | 10/2021 | Ratajczak | B64U 60/50 |
| 2022/0015310 A1* | 1/2022 | Raj | G05D 1/689 |
| 2022/0022119 A1 | 1/2022 | Sai | |
| 2022/0303945 A1* | 9/2022 | Tsuda | H04W 68/005 |
| 2022/0408331 A1* | 12/2022 | Park | H04W 36/302 |
| 2023/0337123 A1* | 10/2023 | Tsuda | H04L 67/51 |

FOREIGN PATENT DOCUMENTS

| | | | |
|---|---|---|---|
| JP | 2020170888 A | 10/2020 | |
| WO | 2020079937 A1 | 4/2020 | |

OTHER PUBLICATIONS

Decision to Grant a Patent issued for counterpart Japanese Application No. 2022-008557, transmitted from the Japanese Patent Office on Jun. 7, 2022 (drafted on Jun. 1, 2022).

Office Action issued for counterpart Japanese Application No. 2022-008557, transmitted from the Japanese Patent Office on Apr. 12, 2022 (drafted on Apr. 4, 2022).

* cited by examiner

COMMUNICATION SYSTEM

The contents of the following patent applications are incorporated herein by reference:
NO. 2022-008557 filed in JP on Jan. 24, 2022
NO. PCT/JP2023/001221 filed in WO on Jan. 17, 2023

BACKGROUND

1. Technical Field

The present invention relates to a communication system.

2. Related Art

Patent document 1 describes a flight vehicle which forms a wireless communication area on the ground by radiating a beam to the ground, to provide a wireless communication service for a user terminal in the wireless communication area.

PRIOR ART DOCUMENT

Patent Document

Patent Document 1: Japanese Patent Application Publication No. 2020-170888

DESCRIPTION OF EXEMPLARY EMBODIMENTS

Wireless communication services are provided by wireless carriers through ground wireless base stations, but if a long-term suspension of radio wave transmission occurs due to, for example, seismic sea waves or the like, it would take a long time to newly install their facilities. In addition, in the event of a disaster or the like, nothing can be done without radio waves even if an emergency contact is required. Moreover, if ground transportation networks are disrupted, the wireless base stations cannot be restored. In contrast, the communication system 10 according to the present embodiment builds a closed-area network on the ground, using a flight vehicle such as a HAPS (high altitude platform station) which forms a wireless communication area by radiating a beam to the ground and provides a wireless communication service to user terminals in the wireless communication area. It builds a way to allow the user terminals in the closed-area network to contact other user terminals or the like in the closed-area network by intentionally restricting functions that connect to the outside such as networks on the ground or the like, so that the wireless communication service is promptly provided in the closed-area network. In addition, the communication system 10 captures an image of the ground from above in the air by a camera, for example, mounted on the HAPS, determines the areas or the like that have high risks at the time of a disaster, and accumulates time-series changes in positional information from the user terminals to provide information according to damaged situations.

Hereinafter, the invention will be described through embodiments of the invention, but the following embodiments do not limit the invention according to claims. In addition, not all of the combinations of features described in the embodiments are imperative to the solving means of the invention.

Figure 1:
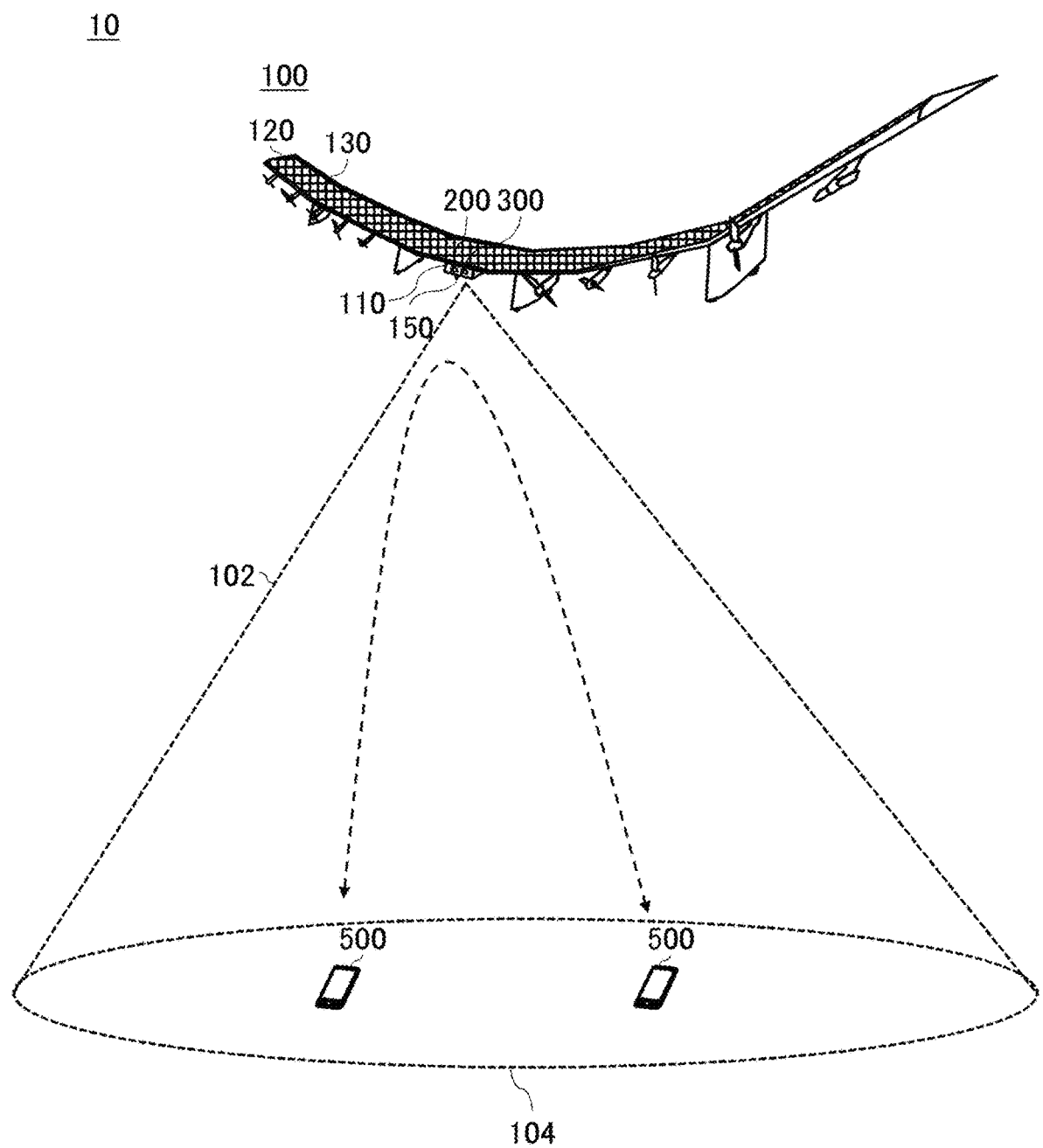
FIG. 1 schematically illustrates an example of a communication system 10.

FIG. 1 schematically illustrates an example of a communication system 10. The communication system 10 includes a base station apparatus 200 mounted on a flight vehicle 100. The communication system 10 further includes a processing server 300. The base station apparatus 200 and the processing server 300 may be a single-piece structure. In this case, an apparatus that includes the base station apparatus 200 and the processing server 300 may be the example of the communication system.

Although in the example shown in FIG. 1, the processing server 300 is mounted on the flight vehicle 100, the processing server 300 may not be mounted on the flight vehicle 100. In the latter case, the processing server 300 is arranged on the ground, for example, and communicates with the base station apparatus 200 of the flight vehicle 100 through an FL (feeder link). The communication system 10 may include the flight vehicle 100.

The flight vehicle 100 may include an SL (service link) antenna and form a wireless communication area 104 by radiating a beam 102 to the ground using the SL antenna. The flight vehicle 100 may establish a service link with user terminals 500 in the wireless communication area 104. In addition, the flight vehicle 100 may include an FL antenna and form a feeder link between itself and gateways or the like on the ground using the FL antenna.

The flight vehicle 100 may function as a stratosphere platform. The flight vehicle 100 may be a HAPS (high altitude platform station), for example. The flight vehicle 100 may relay communication between the user terminals 500 in the wireless communication area 104 and a core network or the Internet on the ground through the service link and the feeder link.

The flight vehicle 100 includes a body portion 110, a wing portion 120, and a solar panel 130. Electrical power generated by the solar panel 130 is stored in one or more batteries arranged in at least any of the body portion 110 or the wing portion 120. The electrical power stored in the battery is used by each component included in the flight vehicle 100.

The base station apparatus 200 and the processing server 300 are arranged in the body portion 110. The base station apparatus 200 may be compliant with the 5G (5th generation) communication protocol. The base station apparatus 200 may be compliant with the 4G (4th generation) communication protocol. The base station apparatus 200 may be compliant with the 3G (3rd generation) communication protocol. The processing server 300 may be a so-called MEC (mobile edge computing) server.

In addition, a flight control apparatus (not shown) is arranged in the body portion 110. The flight control apparatus is configured to control flight of the flight vehicle 100. The flight control apparatus controls the flight of the flight vehicle 100 by controlling rotations of propellers, angles of flaps or elevators or the like, for example. The flight control apparatus may manage various types of sensors included in the flight vehicle 100. Examples of the sensors include a positioning sensor such as a GPS (global positioning system) sensor, a gyro sensor, an acceleration sensor, a wind sensor, a meteorological sensor or the like. The flight control apparatus may manage the position, the attitude, the movement direction, the movement speed, or the like of the flight vehicle 100 by outputs of the various types of sensors.

The flight vehicle 100 according to the present embodiment functions, for example, as a stratosphere platform in normal times, whereas at the time of a disaster, it moves to the air above the ground area where the disaster has occurred and generates the wireless communication area 104 on the ground to provide the closed-network service in the wireless communication area 104. In the example shown in FIG. 1, the flight vehicle 100 provides the closed-network service to the user terminals 500 in the wireless communication area 104 by the service link, without establishing the feeder link. For example, if a widespread radio disturbance occurs due to a large-scale disaster, the flight vehicle 100 provides services such as those that enable reciprocal contact only in the closed area of the wireless communication area 104. In this manner, by limiting the service to be within the wireless communication area 104, service provision can be started promptly at the time of a disaster or the like because no connections or the like to the core facilities are needed.

Note that, the flight vehicle 100 may not include a function to establish the feeder link. In this case, the flight vehicle 100 is in a holding flight above in normal times, whereas at the time of a disaster, it moves to the air above the ground area where the disaster has occurred and forms the wireless communication area 104 on the ground to provide the closed-network service in the wireless communication area 104. By the flight vehicle 100 not including the function to establish the feeder link, some facilities of the flight vehicle 100 can be omitted, the weight of the flight vehicle 100 can be decreased, or a processing load can be reduced.

Figure 2:
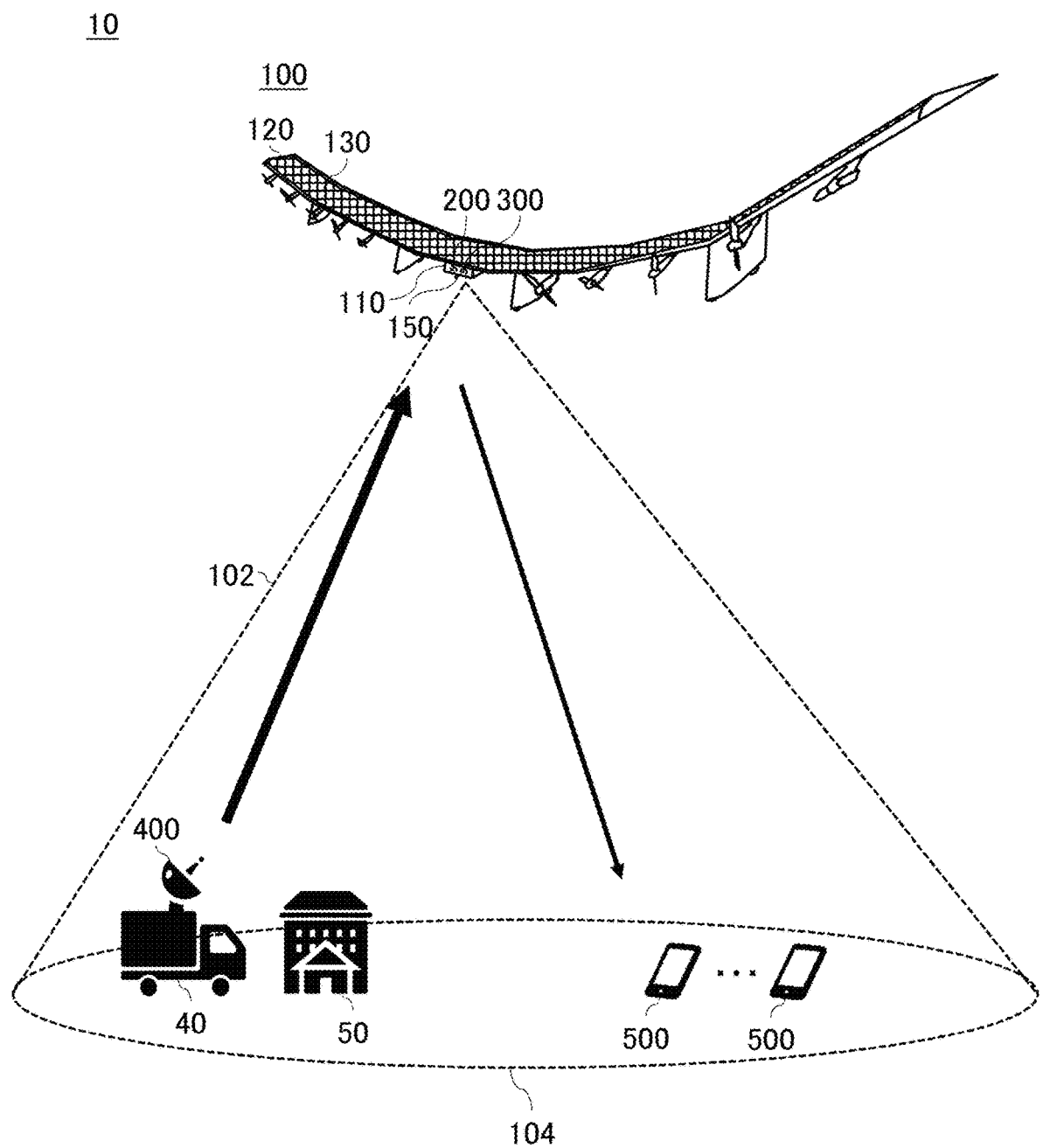
FIG. 2 schematically illustrates an example of the communication system 10.

FIG. 2 schematically illustrates an example of a communication system 10. Here, differences from FIG. 1 are mainly described. The flight vehicle 100 shown in FIG. 2 includes the function to establish the feeder link. In the example shown in FIG. 2, in the event of a disaster or the like, a mobile communication vehicle 40 mounting the closed-network core apparatus 400 moves to the ground area where the disaster has occurred. The mobile communication vehicle 40 moves to, for example, a disaster management headquarters 50 or a disaster hub. Before starting the movement or during the movement of the mobile communication vehicle 40, the closed-network core apparatus 400 may receive the information managed in a home server from a core network of the mobile communication network and store the information.

Although in the example shown in FIG. 2, the closed-network core apparatus 400 is mounted on the mobile communication vehicle 40, the closed-network core apparatus 400 may be mounted on the flight vehicle 100. In this case, the closed-network core apparatus 400 may receive the information managed in the home server from the core network of the mobile communication network and store the information before the flight vehicle 100 takes off, for example. Alternatively, the closed-network core apparatus 400 may receive the information managed in the home server from the core network of the mobile communication network and store the information while the flight vehicle 100 is flying over an area in which a gateway is arranged on the ground.

If the base station apparatus 200, the processing server 300, and the closed-network core apparatus 400 are mounted on the flight vehicle 100, the base station apparatus 200, the processing server 300, and the closed-network core apparatus 400 may be a single-piece structure. In this case, an apparatus that includes the base station apparatus 200, the processing server 300, and the closed-network core apparatus 400 may be the example of the communication system. Alternatively, the base station apparatus 200 and the processing server 300 may be the single-piece structure and the closed-network core apparatus 400 may be a separate structure.

The flight vehicle 100 moves to the air above the ground area where the disaster has occurred, establishes the feeder link with the closed-network core apparatus 400, forms the wireless communication area 104 on the ground, and cooperates with the closed-network core apparatus 400 to provide the closed-network service to the user terminals 500 in the wireless communication area 104.

Although in FIG. 2, a smartphone is shown as an example of the user terminal 500, the user terminal 500 is not limited to this and may be any communication apparatus such as a communication apparatus mounted on an emergency vehicle or a communication apparatus arranged in a medical institution.

The flight vehicle 100 may provide a different service for a priority terminal and a non-priority terminal by cooperating with the closed-network core apparatus 400. For example, identification information of the priority terminal is registered in advance in the processing server 300 of the flight vehicle 100. The identification information may be any kind of information as long as the user terminal 500 can be identified by the information. For example, the identification information is an IMSI (international mobile subscriber identity). Examples of the priority terminal include a user terminal 500 owned by the self-defense forces or emergency response teams or the like conducting rescue operations, or a user terminal 500 owned by municipal offices or the like, although the priority terminal can be registered arbitrarily.

Then, when the base station apparatus 200 is connected to the user terminal 500 in the wireless communication area 104 through the service link, the identification information of the connected user terminal 500 is collected in the closed-network core apparatus 400. Then, when a request from the user terminal 500 is received, the request is processed in the processing server 300. The processing server 300 determines whether the user terminal 500 is a priority terminal, and if the user terminal 500 is determined to be a priority terminal, the processing server 300 provides it with a priority service, and if not, the processing server 300 provides it with a limited service that is more limited than the priority service. For example, if a limited service is to be provided, the processing server 300 may use the network slicing technique to provide a part of the service. For example, the processing server 300 provides disaster information related to the disaster or evacuation information indicating an evacuation site, but does not provide, or provides with less priority, a voice communication service.

Figure 3:
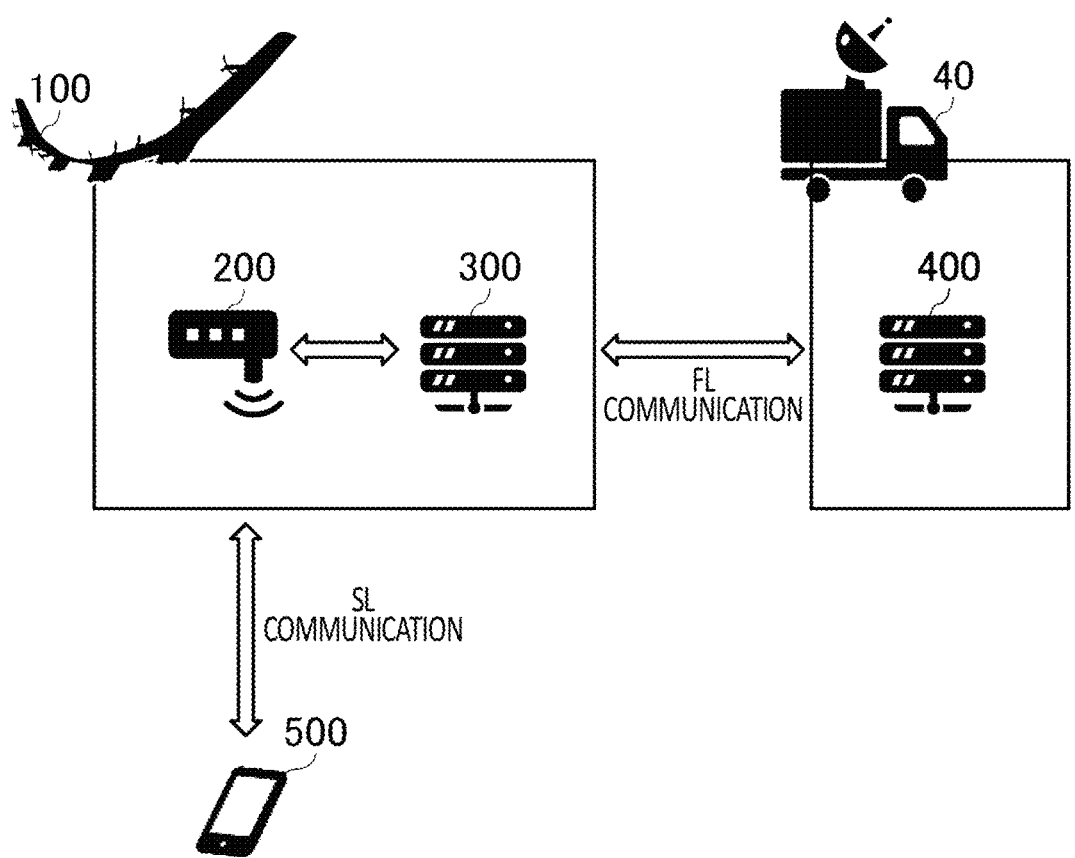
FIG. 3 schematically illustrates an example of a configuration of a communication system 10.

FIG. 3 schematically illustrates an example of a configuration of the communication system 10. In the example shown in FIG. 3, the base station apparatus 200 and the processing server 300 are arranged in the body portion 110 of the flight vehicle 100, whereas the closed-network core apparatus 400 is arranged in the mobile communication vehicle 40 on the ground. The base station apparatus 200 and the processing server 300 perform FL communication with the closed-network core apparatus 400 through the FL, and the base station apparatus 200 performs the SL communication with the user terminal 500 through the SL.

The processing server 300 provides the closed-network service to a plurality of user terminals 500 in the wireless communication area 104. The processing server 300 broadcasts, for example, the disaster information related to the disaster in the wireless communication area 104. The processing server 300 broadcasts, for example, evacuation information indicating the evacuation site in the wireless communication area 104. The processing server 300 may receive the disaster information and the evacuation information from the closed-network core apparatus 400. The processing server 300 may receive the disaster information and the evacuation information at a position where communication with a ground communication apparatus is possible before moving to the air above the area where the disaster has occurred.

The processing server 300 may collect positional information from each of the plurality of user terminals 500. The processing server 300 may determine a situation of the user terminal 500 based on time-series changes in the positional information of the user terminal 500 and transmit information according to the situation to the user terminal 500. The processing server 300 may determine a ground situation based on changes in the positional information of the plurality of user terminals 500 and transmit the information according to the situation to the user terminals 500. The processing server 300 identifies, for example, a position having a traffic disturbance based on movement histories of the plurality of user terminals 500 and transmits the information related to the identification result to the user terminals 500.

The processing server 300 may determine the situation on the ground by acquiring, from a camera 150 on the flight vehicle 100, a captured image of the ground captured by the camera 150 and analyzing the captured image. The processing server 300 identifies, for example, a location where the disaster has occurred, a situation of the disaster, a high-risk area due to the disaster, and a position having a traffic disturbance, or the like and transmits the information related to the identification results to the user terminals 500.

Based on the captured image of the ground, the processing server 300 may define a plurality of types of areas in the ground area in the wireless communication area 104. The processing server 300 defines, for example, the plurality of types of areas by comparing a captured image of the wireless communication area 104 in the past and the captured image captured by the camera 150 of the flight vehicle 100. The captured image of the wireless communication area 104 in the past is, for example, registered in the processing server 300 at the time of disaster occurrence. The processing server 300 may, for example, previously store the captured images of the whole country. Examples of the plurality of types of areas include, but not limited to, a disaster-hit area where the disaster has occurred, a shelter area in which a shelter is arranged, an evacuation guide area in which an evacuation guide is provided, a high-risk area in which a risk due to the disaster is high, or the like.

Figure 4:
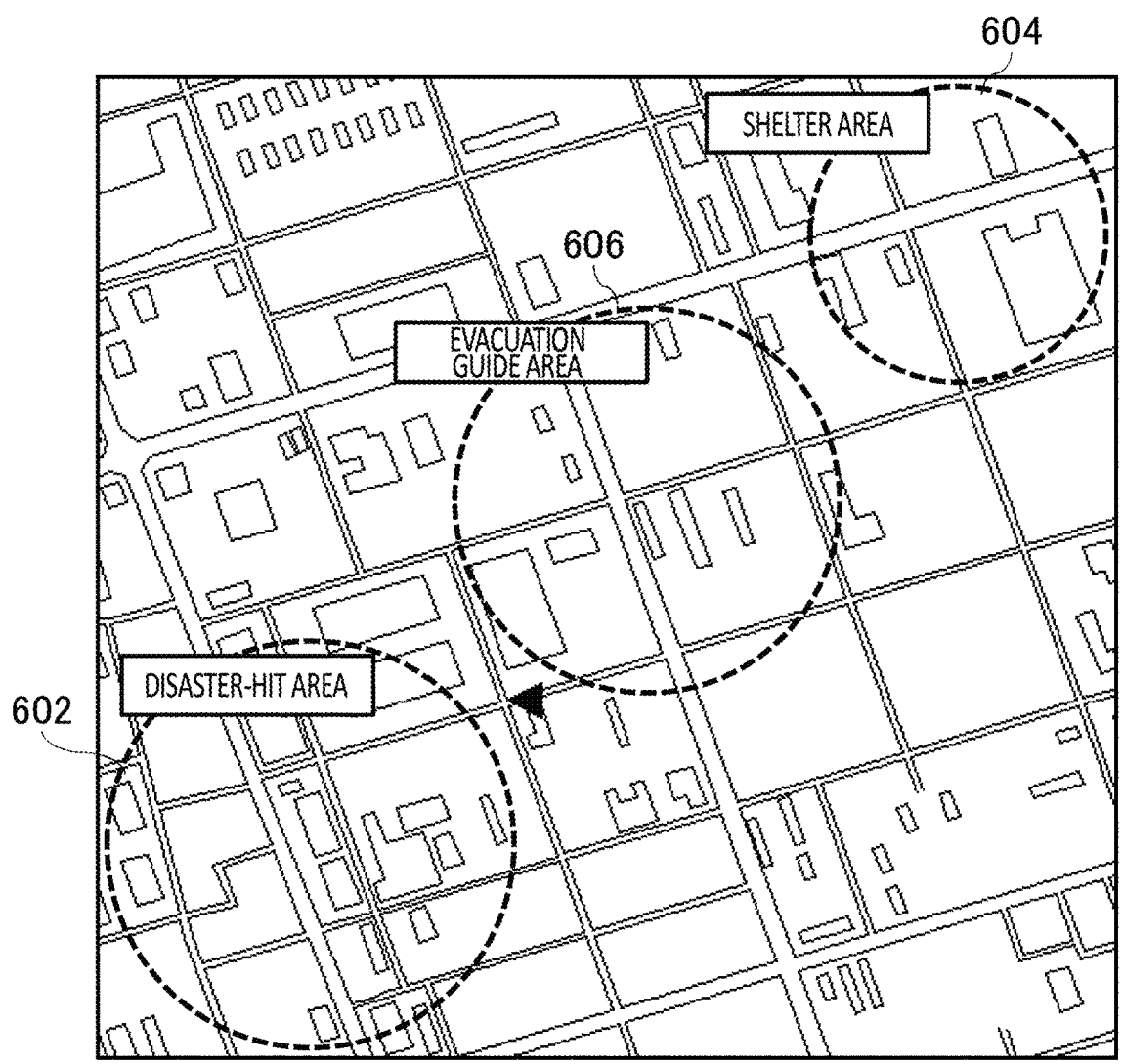
FIG. 4 is a descriptive drawing of a ground area.

FIG. 4 is a descriptive drawing of the ground area. FIG. 4 exemplifies the disaster-hit area 602, the shelter area 604, and the evacuation guide area 606.

The processing server 300 defines, for example, an area having a significant change in its transportation network as the disaster-hit area 602. As a specific example, the processing server 300 calculates a degree of change in the transportation network and defines the area having the degree of change higher than a predetermined threshold as the disaster-hit area 602.

The processing server 300 defines, for example, a predetermined range of the area including a location at which the shelter is set up as the shelter area 604. The processing server 300 may previously receive the information indicating the shelter locations through the ground network or the like, and define the shelter area 604 based on this information and the captured image. In addition, the processing server 300 may define the shelter area 604 further based on the positional information of the plurality of user terminals 500. For example, the processing server 300 defines a location at which the plurality of user terminals 500 that have been moved from the disaster-hit area 602 stop, as the shelter area 604.

The processing server 300 defines, for example, an area between the disaster-hit area 602 and the shelter area 604 as the evacuation guide area 606. The processing server 300 may define an area in which the user terminals 500 are present between the disaster-hit area 602 and the shelter area 604, as the evacuation guide area 606.

The processing server 300 may provide a service that is different for each of the plurality of types of areas. The processing server 300 may provide a service, for example, to transmit different information for each of the plurality of types of areas. The processing server 300 broadcasts various types of information including the positional information of the area for each of the plurality of types of areas. The user terminal 500 receiving the information adopts the information for the area including its own position. In addition, the processing server 300 may control the base station apparatus 200 to focus the beam 102 on each of the plurality of types of areas in time series to cause the information to be transmitted in time series.

The processing server 300 provides a service, for example, to transmit evacuation route information indicating an evacuation route to the user terminals 500 positioned in the disaster-hit area 602. The evacuation route information may indicate a route to escape from the disaster-hit area 602. The processing server 300 may generate the evacuation route information by analyzing the captured image obtained by the camera 150. Alternatively, the processing server 300 may receive the evacuation route information generated in the disaster management headquarters 50 or the like through the closed-network core apparatus 400.

The processing server 300 provides a service, for example, to transmit disaster situation information indicating a disaster situation to the user terminal 500 positioned in the shelter area 604. The processing server 300 may generate the disaster situation information by analyzing the captured image obtained by the camera 150. Alternatively, the processing server 300 may receive the disaster situation information generated in the disaster management headquarters 50 or the like through the closed-network core apparatus 400.

The processing server 300 provides a service, for example, to transmit shelter route information indicating a route to the shelter area 604 to the user terminal 500 positioned in the evacuation guide area 606. The processing server 300 may generate the shelter route information by analyzing the captured image obtained by the camera 150. Alternatively, the processing server 300 may receive the shelter route information generated in the disaster management headquarters 50 or the like through the closed-network core apparatus 400.

Figure 5:
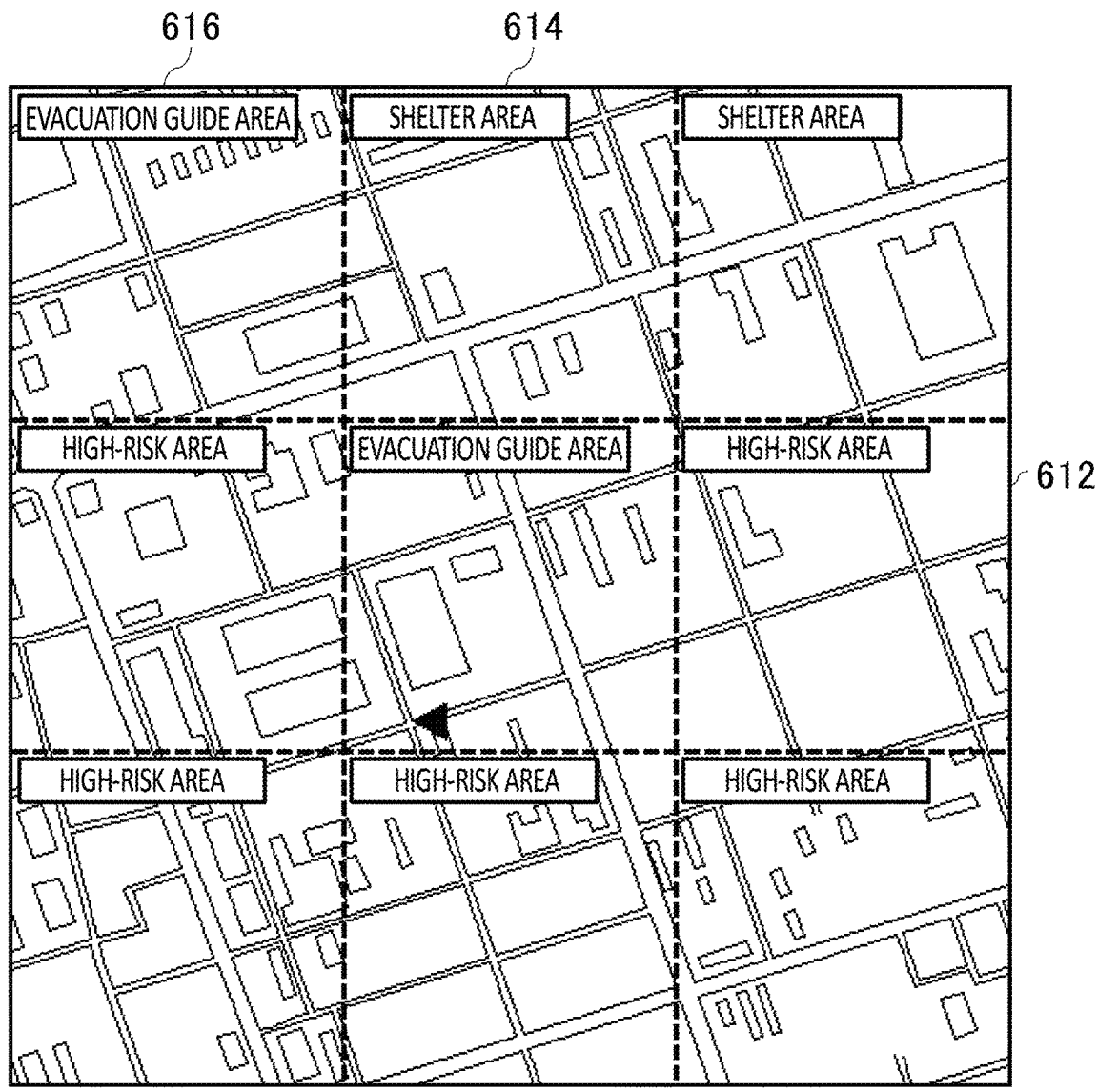
FIG. 5 is a descriptive drawing of the ground area.

FIG. 5 is a descriptive drawing of the ground area. FIG. 5 exemplifies the high-risk area 612, the shelter area 614, and the evacuation guide area 616.

As exemplified in FIG. 5, the processing server 300 may define the plurality of types of areas by segmenting the target area according to the disaster situation.

The processing server 300 provides a service, for example, to transmit evacuation route information indicating an evacuation route to the user terminal 500 positioned in the high-risk area 612. The evacuation route information may indicate a route to escape from the high-risk area 612. The processing server 300 may generate the evacuation route information by analyzing the captured image obtained by the camera 150. Alternatively, the processing server 300 may receive the evacuation route information generated in the disaster management headquarters 50 or the like through the closed-network core apparatus 400.

The processing server 300 provides a service, for example, to transmit disaster situation information indicating a disaster situation to the user terminal 500 positioned in the shelter area 614. The processing server 300 may generate the disaster situation information by analyzing the captured image obtained by the camera 150. Alternatively, the processing server 300 may receive the disaster situation information generated in the disaster management headquarters 50 or the like through the closed-network core apparatus 400.

The processing server 300 provides a service, for example, to transmit shelter route information indicating a route to the shelter area 614 to the user terminal 500 positioned in the evacuation guide area 616. The processing server 300 may generate the shelter route information by analyzing the captured image obtained by the camera 150. Alternatively, the processing server 300 may receive the shelter route information generated in the disaster management headquarters 50 or the like through the closed-network core apparatus 400.

The processing server 300 may collect presence-in-cell information and positional information of the plurality of user terminals 500 to count the number of user terminals 500 for each area. The processing server 300 may, for example, count the number of the user terminals 500 that remain in the high-risk area 612. Then the processing server 300 notifies, for example, the disaster management headquarters 50 or the like of the count result through the closed-network core apparatus 400.

Figure 6:
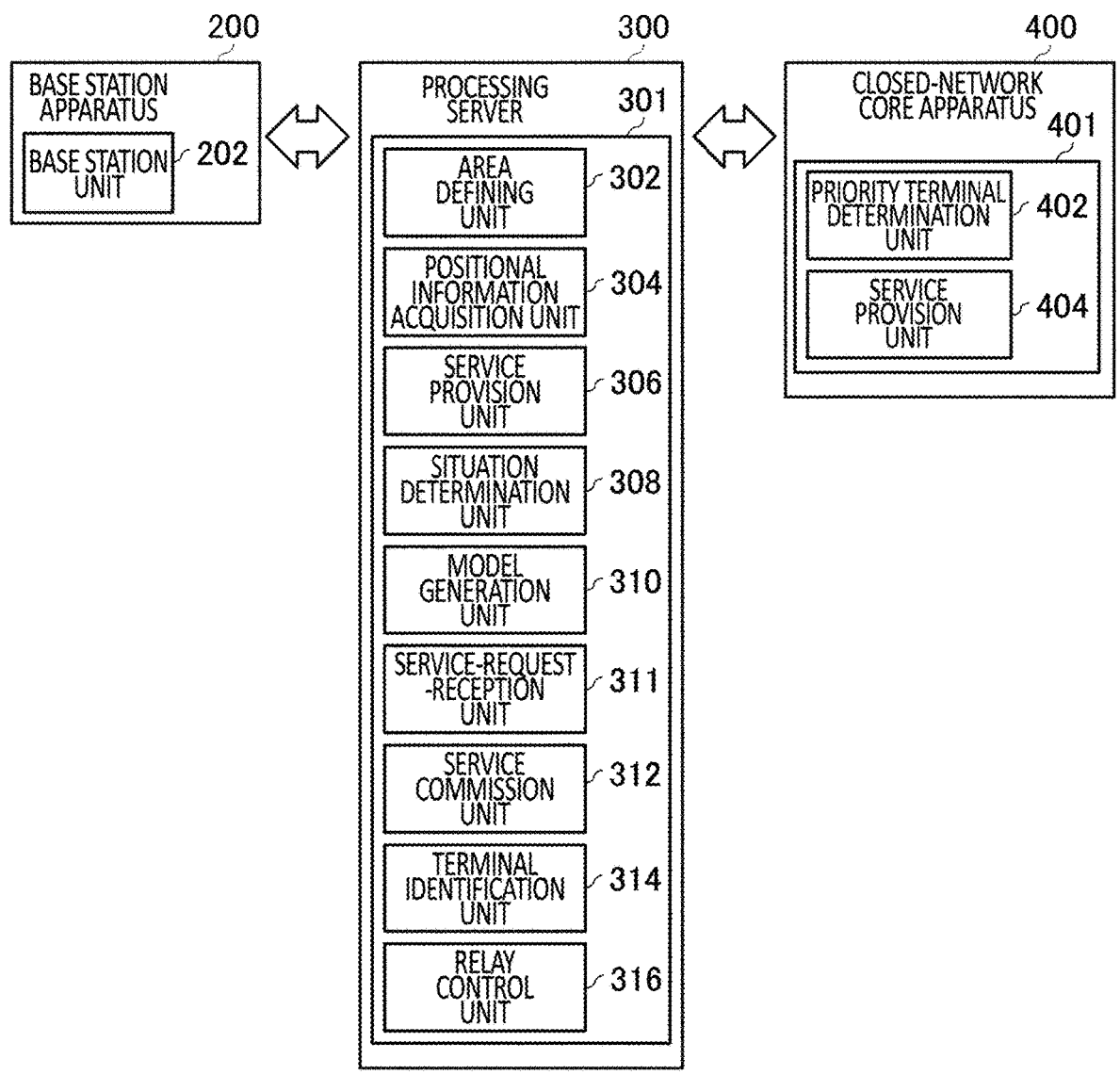
FIG. 6 schematically illustrates an example of a functional configuration of a base station apparatus 200, a processing server 300, and a closed-network core apparatus 400.

FIG. 6 schematically illustrates an example of a functional configuration of the base station apparatus 200, the processing server 300, and the closed-network core apparatus 400.

The base station apparatus 200 includes a base station unit 202. The base station unit 202 performs the function of the wireless base station.

The base station unit 202 forms the wireless communication area 104 on the ground by radiating a beam 102 to the ground using the SL antenna. The base station unit 202 establishes the SL with the user terminal 500 in the wireless communication area 104 to communicate wirelessly with the user terminal 500.

The base station unit 202 communicates with the processing server 300. When the processing server 300 is arranged on the ground, the base station unit 202 may use the FL antenna to establish the feeder link between itself and the processing server 300 and communicate with the processing server 300.

The base station unit 202 communicates with the closed-network core apparatus 400. When the closed-network core apparatus 400 is arranged on the ground, the base station unit 202 may use the FL antenna to establish the feeder link between itself and the closed-network core apparatus 400 and communicate with the closed-network core apparatus 400.

The processing server 300 includes a processing server unit 301. The processing server unit 301 includes an area defining unit 302, a positional information acquisition unit 304, a service provision unit 306, a situation determination unit 308, a model generation unit 310, a service commission unit 312, a terminal identification unit 314, and a relay control unit 316. Note that, it is not necessarily essential that the processing server unit 301 includes all of these.

The processing server unit 301 is communicatively connected to the base station unit 202. The processing server unit 301 provides a service to the user terminal 500 in the wireless communication area 104. The processing server unit 301 provides, for example, a return communication service that relays communication among the plurality of user terminals 500 in the wireless communication area 104.

The area defining unit 302 acquires, from the camera 150 mounted on the flight vehicle 100, a captured image of the ground captured by the camera 150 and defines the plurality of types of areas in the ground area in the wireless communication area 104 based on the captured image. The area defining unit 302 may define a plurality of arbitrary regions in the ground area in the wireless communication area 104 as the plurality of types of areas. In addition, the area defining unit 302 may define the plurality of types of areas by segmenting the ground area in the wireless communication area 104.

The area defining unit 302 defines, for example, the disaster-hit area where the disaster has occurred in the ground area in the wireless communication area 104. The area defining unit 302 defines, for example, the shelter area in which a shelter is arranged in the ground area in the wireless communication area 104. The area defining unit 302 defines, for example, the evacuation guide area in which the evacuation guide is provided in the ground area in the wireless communication area 104. The area defining unit 302 defines, for example, the high-risk area in which people are more likely to be harmed due to the disaster in the ground area in the wireless communication area 104.

The area defining unit 302, for example, calculates a degree of a risk at each location based on an analysis result of the captured image and defines an area having the degree of the risk higher than a predetermined threshold as the high-risk area. The area defining unit 302 calculates the degree of the risk at each location, for example, estimating the risk to be higher in positions nearer to rivers or the sea at the time of a seismic disaster. The area defining unit 302 calculates the degree of the risk at each location, for example, estimating the risk to be higher in positions nearer to a fire site or positions downwind from the fire site at the time of a fire.

The positional information acquisition unit 304 acquires the positional information of the plurality of user terminals 500 in the wireless communication area 104. The positional information acquisition unit 304 may acquire, from the base station unit 202, the positional information received by the base station unit 202 from each of the plurality of user terminals 500. The base station unit 202 receives, for example, the positional information measured by a GNSS (global navigation satellite system) function included in the user terminal 500, from the user terminal 500. Note that, the base station unit 202 may receive the presence-in-cell information of the user terminal 500 as the positional information of the user terminal 500.

The service provision unit 306 provides a service that is different for each of the plurality of types of areas based on the positional information of the plurality of user terminals 500 acquired by the positional information acquisition unit 304. The service provision unit 306 provides a service, for example, to transmit different information for each of the plurality of types of areas. The service provision unit 306 may broadcast various types of information including the positional information of the area for each of the plurality of types of areas. The user terminal 500 receiving the information adopts the information for the area including its own position. In addition, the service provision unit 306 may control the base station unit 202 to focus the beam 102 on each of the plurality of types of areas in time series to cause the information to be transmitted in time series.

The situation determination unit 308 determines situations of the plurality of user terminals 500 based on the positional information of the plurality of user terminals 500 acquired by the positional information acquisition unit 304 and the plurality of types of areas defined by the area defining unit 302. The situation determination unit 308 may determine the situations of the plurality of user terminals 500 based on a positional change of each of the plurality of user terminals 500 and the plurality of types of areas.

The situation determination unit 308 determines, for example, the situation of the user terminals 500 that stay in the disaster-hit area to be a dangerous situation. The situation determination unit 308 determines, for example, the situation of the user terminals 500 in the disaster-hit area which are moving to the outside of the disaster-hit area to be an evacuating situation. The situation determination unit 308 determines, for example, the situation of the user terminals 500 that stay in the high-risk area to be a dangerous situation. The situation determination unit 308 determines, for example, the situation of the user terminals 500 in the high-risk area which are moving to the outside of the high-risk area to be an evacuating situation. The situation determination unit 308 determines, for example, the situation of the user terminals 500 that stay in the shelter area to be an evacuation-completed situation. The situation determination unit 308 determines, for example, the situation of the user terminals 500 that stay in the evacuation guide area to be a confirmation-required situation.

The service provision unit 306 provides, to the plurality of user terminals 500, a service according to the situations of the plurality of user terminals 500 determined by the situation determination unit 308. The service provision unit 306 transmits, for example, alert information and evacuation route information to the user terminals 500 in the dangerous situation. The service provision unit 306 notifies, for example, the user terminals 500 in the evacuating situation to change the evacuation route if the evacuation route should be changed. The service provision unit 306 notifies, for example, the user terminals 500 in the evacuation-completed situation of the disaster situation. The service provision unit 306 transmits, for example, to the user terminal 500 in the confirmation-required situation, information prompting them to report on their situations.

The model generation unit 310 generates, by machine learning which uses, as learning data, availability of a road and a change in the positional information of each of the plurality of user terminals 500 positioned on the road, a learning model which takes, as an input, a change in the positional information of each of the plurality of user terminals 500 and gives, as an output, availability of the road on which the plurality of user terminals 500 are positioned. The learning data may be registered in the processing server 300 previously by an administrator or the like of the communication system 10. The learning data may be prepared, for example, by collecting positional information on a daily basis from the plurality of user terminals 500 and by recording the daily road situations, or the like.

The situation determination unit 308 may determine the situations of the plurality of user terminals 500 using the learning model generated by the model generation unit 310. The situation determination unit 308 inputs, into the learning model, the positional information of the plurality of user terminals 500 acquired by the positional information acquisition unit 304, and thus estimates the road situation at that time. Then, the situations of the plurality of user terminals 500 are determined by the estimated road situation and the positional changes of the plurality of user terminals 500. The situation determination unit 308 determines, for example, a situation of the user terminal 500 that is positioned on a road estimated to be unavailable or that is moving to this road, to be an avoidance-required situation. The service provision unit 306 may transmit alternative route information indicating an alternative route to the user terminals 500 in the avoidance-required situation.

The service-request-reception unit 311 receives a service request from the user terminal 500 in the wireless communication area 104. If the service requested by the service request received by the service-request-reception unit 311 is a first type of service, the service provision unit 306 provides the service to the user terminal 500. The first type of service may be a service that can be provided by the processing server 300. If the service requested by the service request received by the service-request-reception unit 311 is a second type of service, the service commission unit 312 transmits, to the closed-network core unit 401, a service commission commissioning to provide the service. The service commission may include identification information of the user terminal 500. The second type of service may be a service that cannot be provided by the processing server 300 but can be provided by the closed-network core apparatus 400.

The terminal identification unit 314 identifies a user terminal 500, among the plurality of user terminals 500 in the wireless communication area 104, which is able to communicate wirelessly with a ground wireless base station. The terminal identification unit 314 identifies the user terminal 500 which is able to communicate wirelessly with the ground wireless base station, for example, by querying the plurality of user terminals 500 in the wireless communication area 104.

The relay control unit 316 performs control to relay communication between another user terminal 500 in the wireless communication area 104 and a ground network through the user terminal 500 identified by the terminal identification unit 314. The relay control unit 316 commissions, for example, the user terminal 500 identified by the terminal identification unit 314 to perform relay processing. If a response of acceptance is obtained for the commission, the relay control unit 316 starts relaying through the user terminal 500. This allows the user terminal 500 in the wireless communication area 104 to be able to communicate with the ground network even if the ground wireless base station cannot be used due to the disaster.

The closed-network core apparatus 400 includes a closed-network core unit 401. The closed-network core unit 401 includes a priority terminal determination unit 402 and a service provision unit 404. Note that, it is not necessarily essential that the closed-network core unit 401 includes all of these.

The closed-network core apparatus 400 functions as a core network in the closed-area network. The closed-network core apparatus 400 may receive the information managed in a home server of a core network from the core network in the ground mobile communication network and store the information.

The closed-network core unit 401 communicates with the processing server unit 301. When the processing server unit 301 is mounted on the flight vehicle 100 and the closed-network core apparatus 400 is arranged on the ground, the processing server unit 301 and the closed-network core unit 401 may communicate with each other through the feeder link between the flight vehicle 100 and the closed-network core apparatus 400. The processing server unit 301 provides, to the user terminal 500, a service using a phone number or the like of the user terminal 500 by communicating with the closed-network core unit 401.

When the service commission transmitted by the service commission unit 312 is received, the priority terminal determination unit 402 determines whether the user terminal 500 is a priority terminal based on the identification information of the user terminal 500. When the user terminal 500 is determined to be the priority terminal by the priority terminal determination unit 402, the service provision unit 404 provides a priority communication service to the user terminal 500, and when the user terminal 500 is determined not to be the priority terminal, the service provision unit 404 provides, to the user terminal 500, a restricted communication service that is more restricted than the priority communication service.

The priority communication service may be, for example, a priority call service that enables a voice communication to be performed preferentially. The restricted communication service may be, for example, a restricted call service having a lower priority in a queue than the priority terminal.

The priority communication service may be, for example, a service that enables data communication to be performed preferentially. The restricted communication service may be, for example, a data communication service in which packets have a lower priority than that of the priority terminal.

Figure 7:
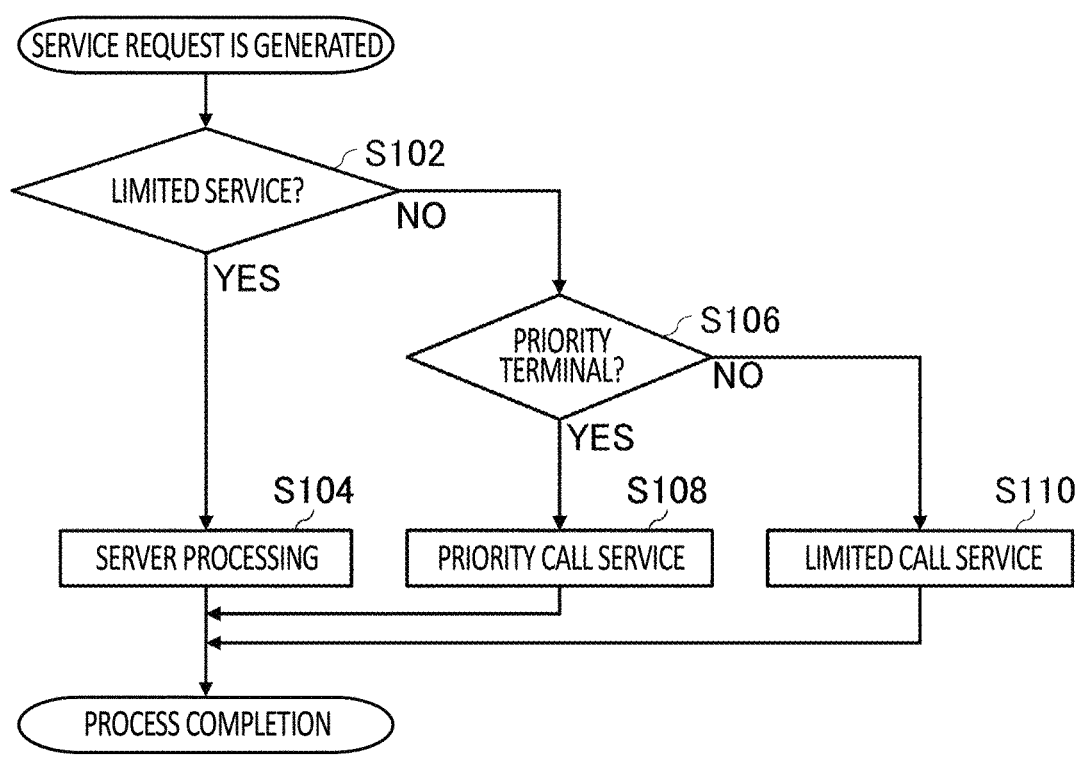
FIG. 7 schematically illustrates an example of a processing flow in the communication system 10.

FIG. 7 schematically illustrates an example of a processing flow in the communication system 10. Here, the description starts with a state in which a service request is generated in the user terminal 500 in the wireless communication area 104.

In step 102 ("step" may be abbreviated to S in some cases), the service-request-reception unit 311 receives the service request from the user terminal 500 and determines whether the requested service is a limited service. The limited service may be a service that can only be provided by the processing server 300. If it is determined to be the limited service, the process proceeds to S104, and if not, the process proceeds to S106.

In S104, the processing server 300 performs processing. Specifically, the service provision unit 306 in the processing server 300 provides the requested service to the user terminal 500.

In S106, the priority terminal determination unit 402 receives the service commission from the service commission unit 312 and determines whether the user terminal 500 is a priority terminal. If it is determined to be the priority terminal, the process proceeds to S108, and if not, the process proceeds to S110.

In S108, the service provision unit 404 provides a priority call service to the user terminal 500. In S110, the service provision unit 404 provides a limited call service to the user terminal 500.

Figure 8:
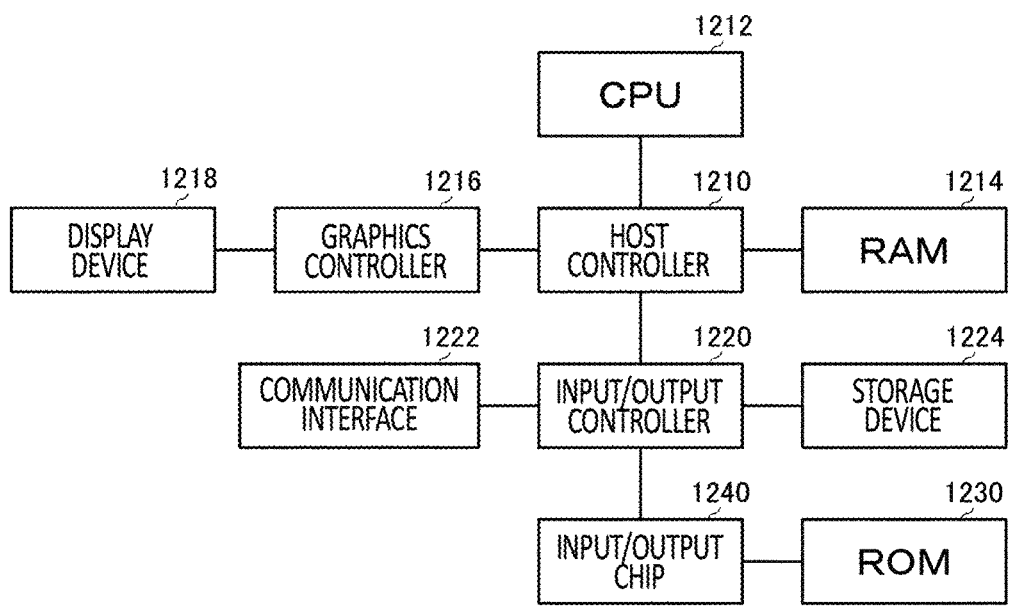
FIG. 8 schematically illustrates an example of a hardware configuration of a computer 1200 functioning as the base station apparatus 200, the processing server 300, or the closed-network core apparatus 400.

FIG. 8 schematically illustrates an example of a hardware configuration of a computer 1200 functioning as the base station apparatus 200, the processing server 300, or the closed-network core apparatus 400. Programs installed in the computer 1200 can cause the computer 1200 to function as one or more "units" of the apparatus according to the above-described embodiment or can cause the computer 1200 to execute operations associated with the apparatuses according to the above-described embodiment or the one or more "units", and/or can cause the computer 1200 to execute a process according to the above-described embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive, and an IC card drive, which are connected to the host controller 1210 through an input/output controller 1220. The storage device 1224 may be a hard disk drive, a solid-state drive, or the like. The computer 1200 also includes a ROM 1230 and a legacy input/output unit such as a keyboard, which are connected to the input/output controller 1220 through an input/output chip 1240.

The CPU 1212 operates according to the programs stored in the ROM 1230 and the RAM 1214, thereby controlling each unit. The graphics controller 1216 acquires image data which is generated by the CPU 1212 in a frame buffer or the like provided in the RAM 1214 or in itself so as to cause the image data to be displayed on a display device 1218.

The communication interface 1222 communicates with other electronic devices through a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units through a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200 and provides cooperation between the programs and the various types of hardware resources described above. An apparatus or method may be constituted by achieving the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may retrieve an entry whose attribute value of the first attribute matches a designated condition, from among the plurality of entries, and read the attribute value of the second attribute stored in the entry, thereby acquiring the attribute value of the second attribute associated with the first attribute satisfying a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 through the network.

Blocks in flowcharts and block diagrams in the present embodiments may represent steps of processes in which operations are performed or "units" of apparatuses responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, or the like. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing apparatus locally or through a local area network (LAN), a wide area network (WAN) such as the Internet or the like in order that the general purpose computer, the special purpose computer, or the processor or the programmable circuitry of the other programmable data processing apparatus performs the computer-readable instruction to provide means for performing operations specified by the flowchart or the block diagram. Examples of the processor include a computer processor, a processing unit, a microprocessor, a digital signal processor, a controller, a microcontroller, or the like.

While the present invention has been described by way of the embodiments, the technical scope of the present invention is not limited to the above described embodiments. It is apparent to persons skilled in the art that various alterations or improvements can be made to the above described embodiments. It is apparent from the description of the claims that embodiments added with such alterations or improvements can also be included in the technical scope of the present invention.

It should be noted that the operations, procedures, steps, stages or the like of each process performed by an apparatus, system, program, and method shown in the scope of the claims, embodiments, or diagrams can be performed in any order as long as the order is not indicated by "prior to," "before," or the like and as long as the output from a previous process is not used in a later process. Even if the process flow is described by using phrases such as "first", "then" or the like in the scope of the claims, embodiments, or diagrams, it does not necessarily mean that the process must be performed in this order.

EXPLANATION OF REFERENCES

10: communication system, 40: mobile communication vehicle, 50: disaster management headquarters, 100: flight vehicle, 102: beam, 104: wireless communication area, 110: body portion, 120: wing portion, 130: solar panel, 150: camera, 200: base station apparatus, 202: base station unit, 300: processing server, 301: processing server unit, 302: area defining unit, 304: positional information acquisition unit, 306: service provision unit, 308: situation determination unit, 310: model generation unit, 312: service commission unit, 314: terminal identification unit, 316: relay control unit, 400: closed-network core apparatus, 401: closed-network core unit, 402: priority terminal determination unit, 404: service provision unit, 500: user terminal, 602: disaster-hit area, 604: shelter area, 606: evacuation guide area, 612: high-risk area, 614: shelter area, 616: evacuation guide area, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip.

What is claimed is:

1. A communication system, comprising:
a base station unit that is mounted on a flight vehicle, forms a wireless communication area by radiating a beam to a ground, and communicates wirelessly with a user terminal in the wireless communication area;
a processing server unit that is communicatively connected to the base station unit and provides a service to the user terminal in the wireless communication area: and
a closed-network core unit that provides a mobile communication service of a closed-area network in the wireless communication area formed by the base station unit such that the closed area network restricts the user terminal to contact only a plurality of user terminals in the wireless communication area, wherein
the processing server unit includes
an area defining unit that defines a plurality of types of areas in a ground area in the wireless communication area based on a captured image of a ground captured by a camera mounted on the flight vehicle,
a positional information acquisition unit that acquires positional information of the plurality of user terminals, each being identical to the user terminal, in the wireless communication area, and
a service provision unit that provides a different service for each of the plurality of types of areas based on the positional information of the plurality of user terminals.

2. The communication system according to claim 1, wherein
the area defining unit defines, in a ground area in the wireless communication area, a disaster-hit area where a disaster has occurred, a shelter area in which a shelter is arranged, and an evacuation guide area in which an evacuation guide is provided, based on the captured image.

3. The communication system according to claim 1, wherein
the processing server unit further includes
a situation determination unit that determines a situation of each of the plurality of user terminals based on a positional change of each of the plurality of user terminals and the plurality of types of areas defined by the area defining unit, and
the service provision unit provides, to each of the plurality of user terminals, a service according to the situation of each of the plurality of user terminals.

4. The communication system according to claim 3, wherein
the situation determination unit determines a situation of each of the plurality of user terminals using a learning model that takes, as an input, a change in positional information of each of the plurality of user terminals and gives, as an output, availability of a road on which each of the plurality of user terminals is positioned.

5. The communication system according to claim 4, wherein
the processing server unit includes
a model generation unit that generates the learning model by machine learning using, as learning data, availability of a road and a change in positional information of each of a plurality of user terminals positioned on the road.

6. The communication system according to claim 1, wherein
the processing server unit is mounted on the flight vehicle.

7. The communication system according to claim 6, wherein
the processing server unit is arranged in a mobile edge computing (MEC) server mounted on the flight vehicle.

8. The communication system according to claim 6, wherein
the closed-network core unit is arranged in a closed-network core apparatus on a ground,
the processing server unit and the closed-network core unit communicate with each other through a feeder link between the flight vehicle and the closed-network core apparatus, and
the processing server unit provides a service that uses a phone number of the user terminal by communicating with the closed-network core unit.

9. The communication system according to claim 8, wherein
the closed-network core apparatus is mounted on a mobile communication vehicle.

10. The communication system according to claim 1, wherein
the closed-network core unit is mounted on the flight vehicle, and
the processing server unit provides a service that uses a phone number of the user terminal by communicating with the closed-network core unit.

11. The communication system according to claim 1, wherein
the processing server unit provides a return communication service that relays communication among a plurality of user terminals, each being identical to the user terminal, in the wireless communication area.

12. The communication system according to claim 1, wherein
the flight vehicle functions as a stratosphere platform.

13. A communication system, comprising:
a base station unit that is mounted on a flight vehicle, forms a wireless communication area by radiating a beam to a ground, and communicates wirelessly with a user terminal in the wireless communication area;
a processing server unit that is communicatively connected to the base station unit and provides a service to the user terminal in the wireless communication area; and a closed-network core unit that provides a mobile communication service of a closed-area network in the wireless communication area formed by the base station unit such that the closed area network restricts the user terminal to contact only a plurality of user terminals in the wireless communication area, wherein the processing server unit includes a terminal identification unit that identifies a user terminal, among the plurality of user terminals in the wireless communication area, which is able to communicate wirelessly with a ground wireless base station, and a relay control unit that performs control to relay communication between another user terminal in the wireless communication area and a ground network through the user terminal identified by the terminal identification unit.

14. The communication system according to claim 13, wherein the processing server unit is mounted on the flight vehicle.

15. The communication system according to claim 14, wherein the processing server unit is arranged in a mobile edge computing (MEC) server mounted on the flight vehicle.

16. The communication system according to claim 14, wherein the closed-network core unit is arranged in a closed-network core apparatus on a ground, the processing server unit and the closed-network core unit communicate with each other through a feeder link between the flight vehicle and the closed-network core apparatus, and the processing server unit provides a service that uses a phone number of the user terminal by communicating with the closed-network core unit.

17. The communication system according to claim 16, wherein the closed-network core apparatus is mounted on a mobile communication vehicle.

18. The communication system according to claim 13, wherein the closed-network core unit is mounted on the flight vehicle, and the processing server unit provides a service that uses a phone number of the user terminal by communicating with the closed-network core unit.

19. The communication system according to claim 13, wherein the processing server unit provides a return communication service that relays communication among a plurality of user terminals, each being identical to the user terminal, in the wireless communication area.

20. The communication system according to claim 13, wherein the flight vehicle functions as a stratosphere platform.

* * * * *